Dec. 4, 1928.
C. KLEIN
1,694,343
TRUCK
Filed April 29, 1927
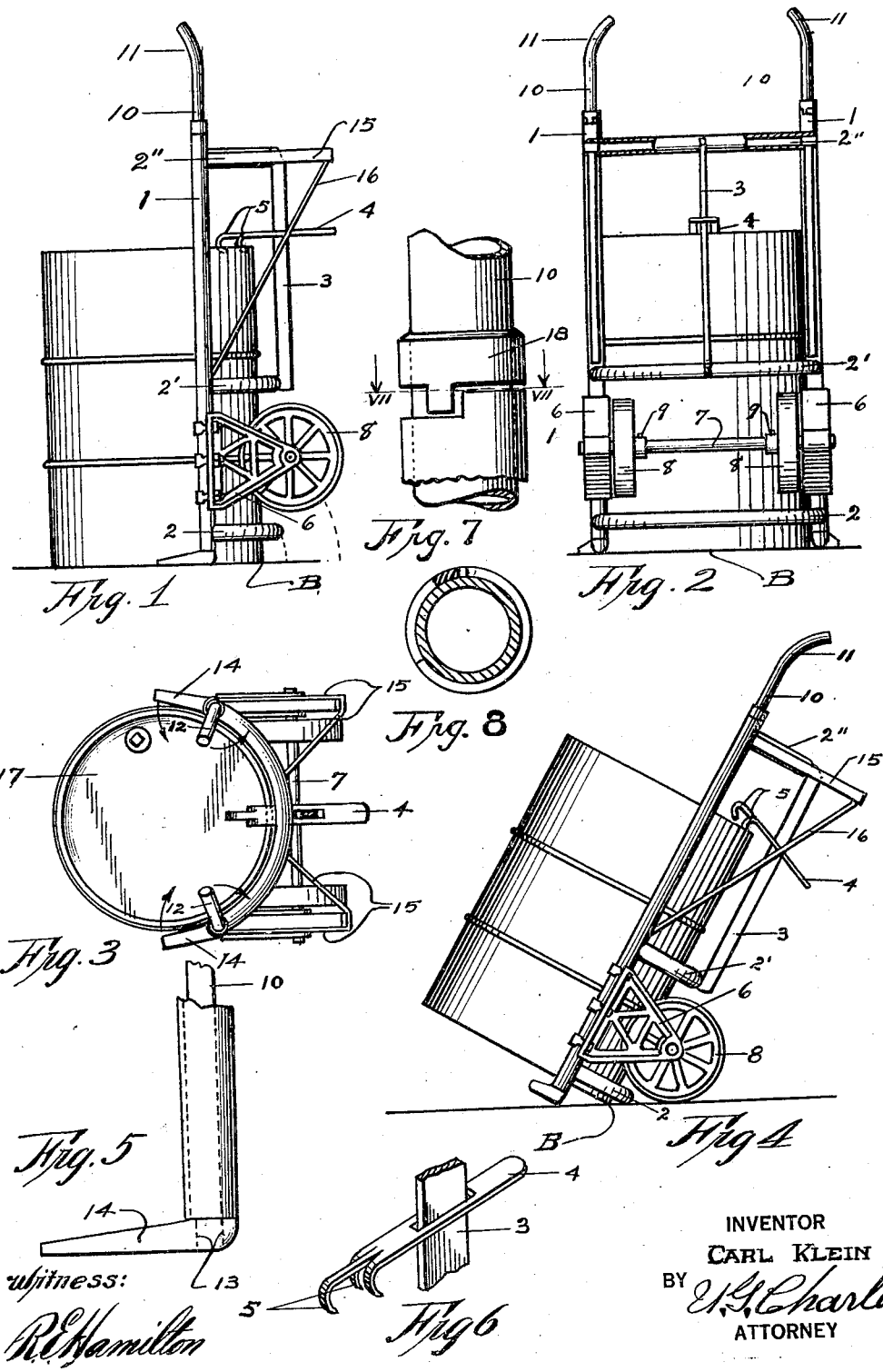
INVENTOR
CARL KLEIN
BY
ATTORNEY Patented Dec. 4, 1928.

1,694,343

UNITED STATES PATENT OFFICE.

CARL KLEIN, OF WICHITA, KANSAS.

TRUCK.

Application filed April 29, 1927. Serial No. 187,535.

My invention relates to improvements in trucks, adapted for the cartage of barrels, and has for its chief object, means for tilting, supporting and loading the barrel in readiness for conveyance.

A further object of my invention is to provide a truck having the wheels trunnioned intermediate the side arms as space conserving means.

A still further object of my invention is to provide a truck having the curvature of the handles transversely position to the toe members so that when drawn rearward by the handles the toe members are inclined to move toward each other beneath the barrel as it is rocked rearward.

A still further object of my invention is to provide a truck that can be attached to a barrel that is standing on end, properly holding and loading it, while the truck is being conveyed rearward, after which it may be conveyed as desired.

These and other objects will hereinafter be more fully explained.

Referring to the drawings:

Fig. 1 is a side elevation of the truck, vertically positioned against the side of a barrel.

Fig. 2 is a transverse view of Fig. 1.

Fig. 3 is a plan view of Fig. 1.

Fig. 4 is a side view of the truck in the act of receiving the barrel.

Fig. 5 is an enlarged detailed view of the foot and its connecting means with the shafts.

Fig. 6 is an enlarged perspective view of the hook.

Fig. 7 is an enlarged detail view of the handle stop.

Fig. 8 is a sectional view taken on line VII—VII in Fig. 7.

The truck herein described consists of a pair of tubular side arms 1; said arms being parallel and rigidly connected by arcuate members 2, 2' and 2''. The members 2' and 2'' are centrally connected by a flat bar 3, on which is slidably mounted a hook member 4 having a plurality of hooks 5 on one end to engage on the chime of the barrel as tilting means therefor as the truck is rocked rearward.

Rigidly attached to the arms 1, and centrally positioned between the arcuate members 2 and 2' are brackets 6 functioning as supports for the axle 7 rigidly attached thereto, upon which wheels 8 and loosely engaged, being held in proper position by collars 9 rigidly attached to said axle 7.

Rotatably mounted in the hollow of the side arms 1 are shafts 10, each having an arcuated end for handles 11, whereby a turning means for said shafts is provided. On the opposite end of said shafts are rigidly connected toe members 14, the said members being apertured at the heel to receive the ends of the shafts as shown by dotted lines 13, and when properly positioned is attached by means of welding.

Rigidly attached to the side arms and to the arcuate member 2' are supports 15 functioning as bearing when said arms are rocked downward to a parallel position with the floor. Said supports are braced to the side arms by means of rods 16 which are rigidly attached at both ends. 17 is the top end of a barrel when positioned as in Fig. 1. 18 is the handle stop which controls the position of the toe members 14.

Operation of the mechanism as herein described will be as follows:—

The truck is conveyed to the barrel and placed in a vertical position as the side thereof as shown in Fig. 1, and the hook member 4 is placed in engagement over the chime of the barrel, then being ready for tilting by a rearward pull on the handles 11 and arms 1.

Before the barrel is tilted from its position as it stands on end, and in contact with the truck, the end of the barrel and the toe members 14 are on one horizontal plane simultaneously, the toe members being turned outward to span the periphery of the barrel.

When the truck and barrel are tilted rearward simultaneously, the heels of the toe members 14 function as bearings on which the truck rests, during the time the barrel rests on the fulcrum point at B, said point being the intersection of two lines representing the lower end and under side of the barrel.

The said lines are equivalent to the altitude and base, of a right angle triangle, said base being parallel with the first horizontal plane as shown in Fig. 1, till the barrel is rocked or tilted on the fulcrum point B at which time the end of the barrel represents an auxiliary plane, the two planes diverging from said fulcrum point as the truck is tilted rearward.

The truck is constructed so that a line drawn from the heel of one toe member to the heel of the other toe member constitutes the chord of a segment of a circle, said fulcrum point being in the center of the arc of such segment, causes the barrel to slide upward on the truck, a distance equal to the versed sine of the segment, thereby permitting the toe members to be rocked inward under the end of the barrel.

In a further rearward tilting, the fulcrum point is changed to the wheels 8 and the barrel and toe members are released from the floor, permitting the barrel to slip forward and engage with the toe members which prevents the barrel from slipping off the truck as it is conveyed as desired.

Such modifications may be employed as lie within the scope of the appended claims.

Having thus described my invention, what I claim as new and desire to secure by Letters Patent is:—

1. In a truck having tubular side arms, an arcuate load carrying means connecting the arms, shafts rotatably positioned in the arms having toe members on the forward ends and a curve for handles on the opposite ends, the curved portions transversely positioned to the toe members so that when drawn rearward the toe members will rock toward each other, a bar and a hook member having a slot to slidably engage on the bar as means to attach the top of a barrel to the truck, the side arms and toe members spanning a peripheral portion of the barrel so that when said barrel is rocked rearward the bottom thereof will rise above said toe members which are automatically turned thereunder by the rearward pull of the curved handles, all substantially as described.

2. In a truck for carrying barrels, side arms having rockably mounted handles for directing the truck, and a toe member adapted to be actuated by each handle, heels for the toe members in axial alignment with the side arms functioning as fulcrum points for the truck when rocking the barrel rearward therewith, arcuate members connecting the side arms so that the peripheral portion of the barrel contacting at the center of said members will be rearwardly positioned to the alignment of the said heel members for sliding movement in opposite directions of the side arms and the barrel, by which movement the toes are free to rock under the barrel, a triple hook member to tie the top of the barrel to the arcuate members as tilting means therefor by the truck, brackets attached to the arms and an axle rigidly carried by the brackets, wheels rotatably mounted on the axle as carrying means therefor.

3. In a truck, the combination of tubular side arms with wheels attached as carrying means therefor, shafts rotatably engaging in said arms, transversely positioned toe members rigidly connected on the forward ends of the shafts, an arcuate member connecting the arms, other arcuate members spaced along said arms as carrying means for a barrel or the like, a bar member carried by two of the last mentioned arcuate members, a hook member having a slot in the handle thereof to engage rockably and slidably along said bar as means to tilt the barrel rearward simultaneously with the truck till the truck and barrel reach positions where the toes will rock beneath the barrel, brackets attached to the side arms, an axle rigidly attached to the brackets and wheels rotatably mounted on the axle as carrying means for the frame, and handles on said shafts whereby the truck may be directed and controlled, and the shafts may be rotated for controlling the toes.

4. In a truck of the kind described, tubular side arms with wheels attached and shafts rotatably mounted in the arms, toe members attached to the front ends of the shafts, the heels of said members functioning as the fulcrum points for the truck when tilting a barrel rearward to load thereon a stop member rigidly attached to each of the shafts to engage on the rear ends of the side arms to prevent said shafts from sliding longitudinally in the arms when the weight of the barrel is imposed on the toe curved members, transversely positioned members connecting the arms as carrying means for a barrel so that the peripheral portion of the barrel engaging therewith is rearwardly positioned to the heel of the toes so that by rocking the truck and barrel rearwardly simultaneously a longitudinal sliding movement of the truck in the opposite direction will permit the toes to rock to engagement beneath the barrel as supporting means as the truck is rocked to its normal conveying position, a bar having a hook member slidably engaging thereon as tying means for the top of the barrel to the truck, the said hook member adapted to rock to accommodate for the sliding movement for the barrel and truck.

5. In a truck having tubular side arms and arcuate members to extend below the alignment of the arms as carrying means for a barrel, shafts rockably engaging with the side arms, toe members rigidly attached to the front ends of the shafts, said shafts having a curvature on the opposite ends transversely positioned to the toe members so that when the truck is rocked rearwardly by the curved ends the toe members are rocked toward each other beneath the barrel, a bar centrally positioned between the arms and carried by the cross members, a handle having a slot to slidably engage on the bar, a pair of hooks on the end of the handle the points thereof transversely aligned to the handle, a third hook extending further longitudinally of the handle as means to engage the differently positioned chimes of a barrel, the said handle to rock to accommodate for the sliding movement of the barrel and truck as described when tilted rearward.

6. In a device of the class described, a truck having a frame and supporting wheels, members journaled longitudinally of the frame at the sides of the truck for independent rotary movement, having angularly projecting toe members at their lower ends and handle members at their upper ends whereby the truck may be directed and the toe members controlled.

7. In a device of the class described, a truck having a frame and supporting wheels, rockable toes at one end of said truck, handles at the other end of said truck, and means for operatively connecting each toe with one of the handles whereby each toe may be actuated by its handle, independently of the other toe and handle and the handles may be used to direct and control the truck.

8. In a structure of the class described, a truck having a frame and having supporting wheels journaled beneath the frame and spaced from the forward end of the truck to permit the truck to be supported on its forward end free of the wheels, toes rockably mounted on the forward end of the truck, truck directing handles at the other end of the truck rotatably journaled on the frame, each handle being operatively connected with one of the toes whereby each toe may be operated by its handle.

9. In a device of the class described, a truck having a frame shaped to receive and support a barrel, means on the truck for engaging the chime of a barrel, toes rockably mounted on one end of the truck, truck directing handles at the other end of the truck each being operatively connected with one of said toes, portions of said truck frame being adapted to serve as fulcrums, whereby the truck may be stood upright adjacent to a barrel and said means may be engaged with the chime of the barrel and the truck tilted on said frame portions for tilting the barrel on its lower chime, and thereupon the handles may be rocked for moving the toes to position under the barrel.

In testimony whereof I affix my signature.

CARL KLEIN.